(12) United States Patent
Homma

(10) Patent No.: US 9,875,073 B2
(45) Date of Patent: Jan. 23, 2018

(54) PRINTING APPARATUS AND CONTROL METHOD THEREFOR

(71) Applicant: CANON KABUSHIKI KAISHA, Tokyo (JP)

(72) Inventor: Takayuki Homma, Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/269,119

(22) Filed: Sep. 19, 2016

(65) Prior Publication Data

US 2017/0090837 A1    Mar. 30, 2017

(30) Foreign Application Priority Data

Sep. 24, 2015    (JP) ................................. 2015-187462

(51) Int. Cl.
*G06F 3/12* (2006.01)
*H04N 1/00* (2006.01)
*H04N 1/32* (2006.01)

(52) U.S. Cl.
CPC .......... *G06F 3/1273* (2013.01); *G06F 3/1205* (2013.01); *G06F 3/1257* (2013.01); *G06F 3/1259* (2013.01); *G06F 3/1285* (2013.01); *H04N 1/00042* (2013.01); *H04N 1/32112* (2013.01); *H04N 2201/0094* (2013.01); *H04N 2201/3202* (2013.01); *H04N 2201/3204* (2013.01); *H04N 2201/3212* (2013.01)

(58) Field of Classification Search
CPC ....................................................... G06F 3/1273
USPC ........................................................ 358/1.15
See application file for complete search history.

(56) References Cited

U.S. PATENT DOCUMENTS

| | | | | |
|---|---|---|---|---|
| 2008/0005176 A1* | 1/2008 | Shimizu | ............. | H04N 1/00244 |
| 2010/0228801 A1* | 9/2010 | Taniguchi | .......... | G06F 17/30082 707/826 |
| 2010/0332636 A1* | 12/2010 | Sato | ...................... | G06F 3/1203 709/223 |
| 2012/0236361 A1* | 9/2012 | Takei | .................... | G06F 3/1204 358/1.15 |
| 2014/0063548 A1* | 3/2014 | Nagai | ................ | G06K 15/1886 358/1.15 |

FOREIGN PATENT DOCUMENTS

JP    2003-308191 A    10/2003

* cited by examiner

*Primary Examiner* — Jacky X Zheng
(74) *Attorney, Agent, or Firm* — Canon U.S.A., Inc. IP Division

(57) ABSTRACT

A printing apparatus according to the present invention stores in a predetermined storage area, identification information of a print job including a print setting as a monitoring target in accordance with an extension program, for a job registration event issued according to a basic program when the print job is received. Then, for the job registration event issued according to the basic program, a job log including the identification information that has been stored in accordance with the extension program, in a dedicated file different from a normal file.

7 Claims, 13 Drawing Sheets

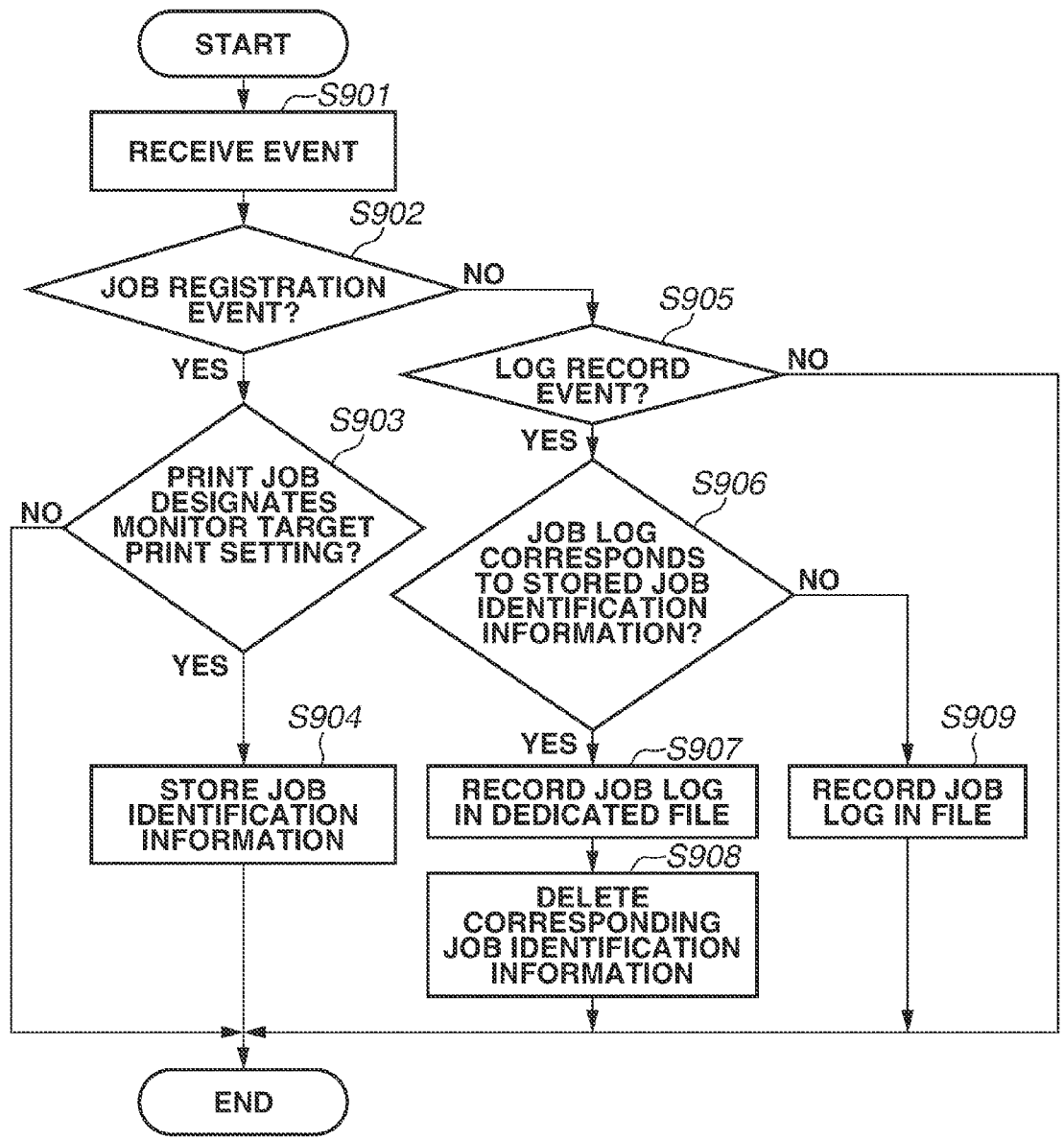

FIG.10A

| JOB ID | 520 |
|---|---|
| APPLICATION NAME | SPREADSHEET |
| DOCUMENT NAME | SALES REPORT (FIRST HALF 2015) |
| OWNER NAME | KANNON |
| INPUT DATE AND TIME | 2015/09/03 15:00 |
| SHEET SIZE | A4 |
| SIMPLEX/DUPLEX | DUPLEX |
| Nup | 4 in 1 |
| PRINT DENSITY | 5 |
| TONER SAVING | ON |
| HOLD PRINTING | ON |
| OUTPUT FACE | FACE DOWN |
| DISCHARGE TRAY | APPARATUS (INTERNAL) TRAY 1 |

FIG.10B

| JOB ID | 520 |
|---|---|
| APPLICATION NAME | SPREADSHEET |
| DOCUMENT NAME | SALES REPORT (FIRST HALF 2015) |
| OWNER NAME | KANNON |
| INPUT DATE AND TIME | 2015/09/03 15:00 |
| START TIME | 2015/09/03 15:03 |
| END TIME | 2015/09/03 15:04 |
| SIMPLEX/DUPLEX | DUPLEX |
| Nup | 4 in 1 |
| SHEET SIZE | A4 |
| NUMBER OF EJECTED SHEET | 2 |

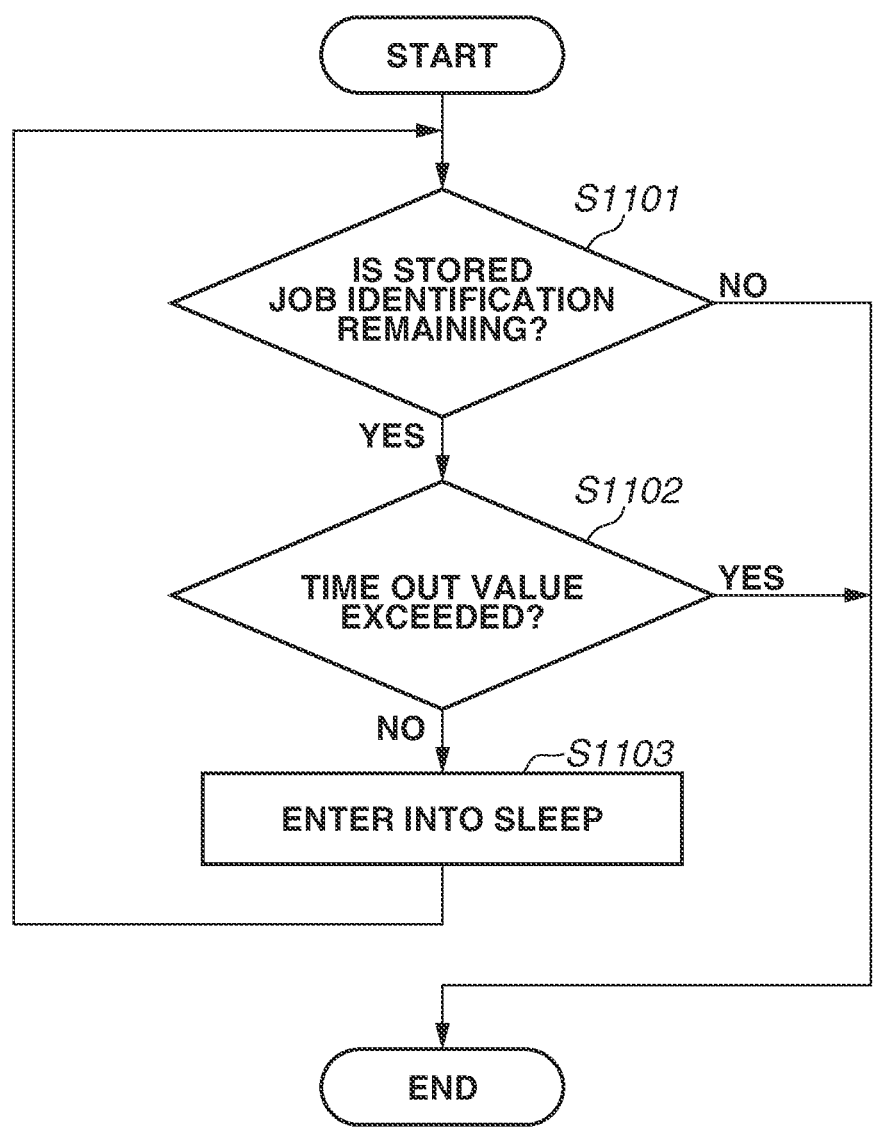

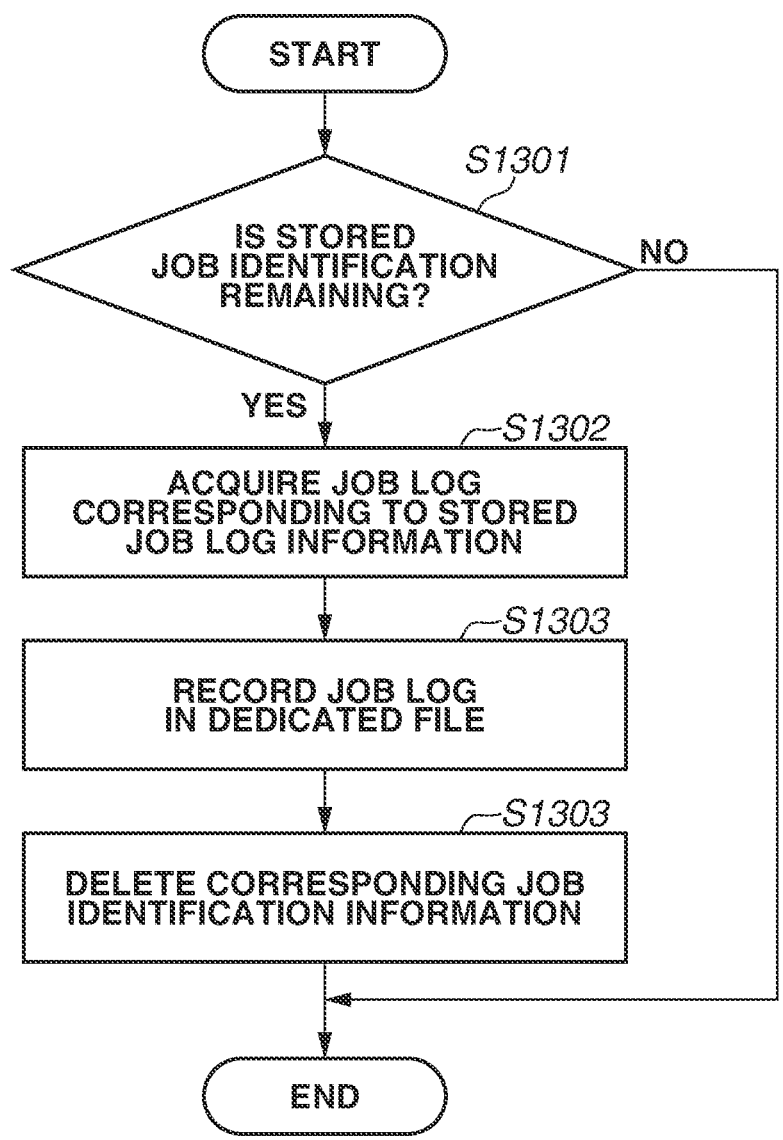

PRINTING APPARATUS AND CONTROL METHOD THEREFOR

BACKGROUND OF THE INVENTION

Field of the Invention

The present invention relates to a technique for recording log information of a print job in a printing apparatus.

Description of the Related Art

In some conventionally known image forming apparatuses including a printing apparatus such as a single function printer (SFP) and a multi function printer (MFP), histories (logs) of print jobs are recorded so that a use status and the like can be recognized. For example, according to a technique discussed in Japanese Patent Application Laid-Open No. 2003-308191, a client transmits a print job to a printing apparatus, and an account server collects log information about the print job from each printing apparatus and manages the log information.

Some log information for the print job is not collectable from the client on a print job generation side, depending on an environment factor where the printing apparatus is installed or functions and types of a printer driver used by the client. Output attributes recorded on a printing apparatus side, do not necessarily include all the print settings related to the print job. In a case of the technique discussed in the above Japanese Patent Application Laid-Open No. 2003-308191, such a design specification is conceivable that some of the setting items of the log information collected from the client, are not recorded on the printing apparatus side.

Furthermore, an existing program that records job logs within the printing apparatus, may not be configured to record some of the setting items.

SUMMARY OF THE INVENTION

The present invention is directed to providing a novel mechanism for recording and managing a job log of which a setting and the like can be grasped that could not be recorded before as log information by a printing apparatus.

A printing apparatus according to an aspect of the present invention in which a basic program for controlling execution of a print job operates includes a first determination unit configured to determine, for a job registration event issued based on the basic program when a print job is received, whether the print job includes designation of a print setting as a monitoring target, a storage unit configured not to store identification information of the print job when the print job does not include the designation of the print setting as the monitoring target, and configured to store the identification information of the print job in a predetermined storage area when the first determination unit determines that the print job includes the designation of the print setting as the monitoring target, a second determination unit configured to determine, for a job registration event issued based on the basic program when a job log corresponding to the print job is recorded, whether identification information in the job log has been stored in the predetermined storage area, and a job log management unit configured to record the job log in a first file when the second determination unit determines that the identification information included in the job lob is stored in the predetermined storage area. The job log management unit is configured to record the job log when the second determination unit determines that the identification information included in the job log is not stored in the predetermined storage area.

Further features of the present invention will become apparent from the following description of exemplary embodiments with reference to the attached drawings.

BRIEF DESCRIPTION OF THE DRAWINGS

FIG. 9 is a flowchart illustrating recording processing for a job log executed by the log record program.

FIGS. 10A and 10B are each a diagram illustrating a specific example of print job contents.

FIG. 11 is a flowchart illustrating processing for terminating the log record program, according to a second exemplary embodiment.

FIG. 13 is a flowchart illustrating processing for starting the log record program, according to the second exemplary embodiment.

DESCRIPTION OF THE EMBODIMENTS

A first exemplary embodiment of the present invention is described below with reference to the drawings.

<System Configuration>

Figure 1:
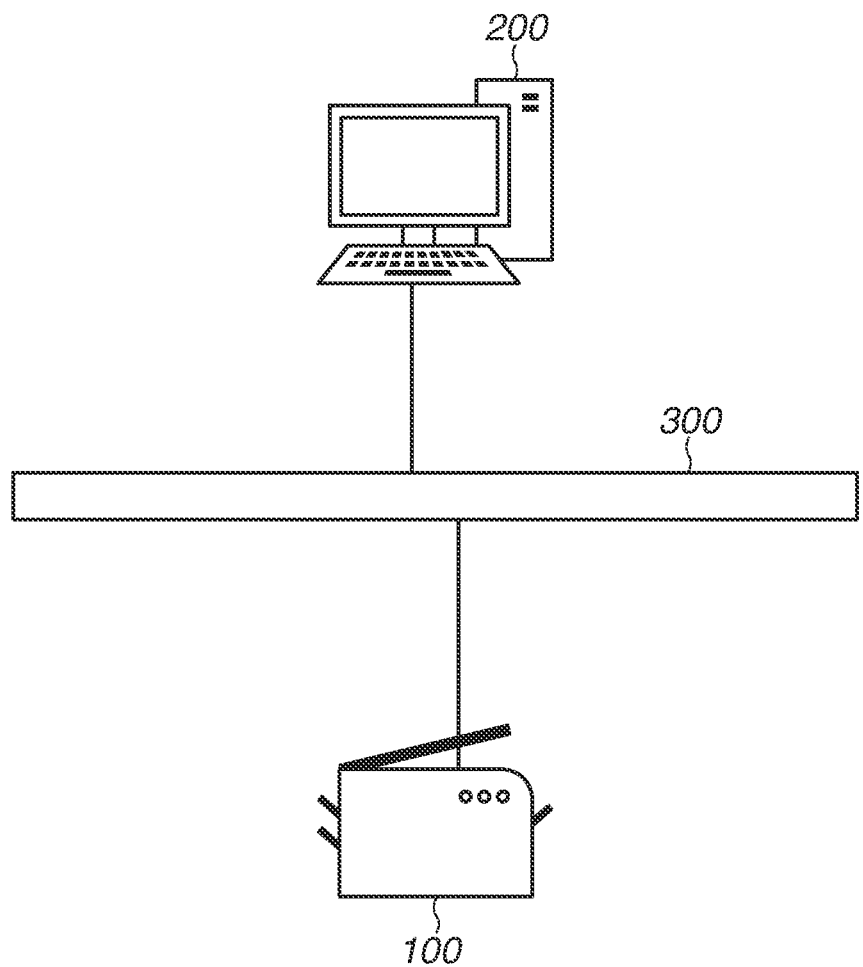
FIG. 1 is a diagram illustrating an example of a configuration of a system according to the present invention.

FIG. 1 is a diagram illustrating an example of a configuration of a system according to the present invention including an image forming apparatus (including a printing apparatus). In the system, an image forming apparatus 100 and a client computer 200 are connected to each other via a network 300 in such a manner that they can communicate with each other. The network 300 is based on a known technique such as Ethernet (registered trademark).

The client computer 200 includes software resources such as a printer driver 702, and can be used by a user to generate print data and issue a print instruction to the image forming apparatus 100. The client computer 200 may be a general desktop computer, or a mobile terminal such as a tablet or a cellular phone.

The image forming apparatus 100 may be a printer, a copier, or a multi function peripheral (MFP) having functions of the printer, the copier, a FAX machine, a file transmitter, and the like in an integrated manner.

<Configuration of Client Computer 200>

Figure 6:
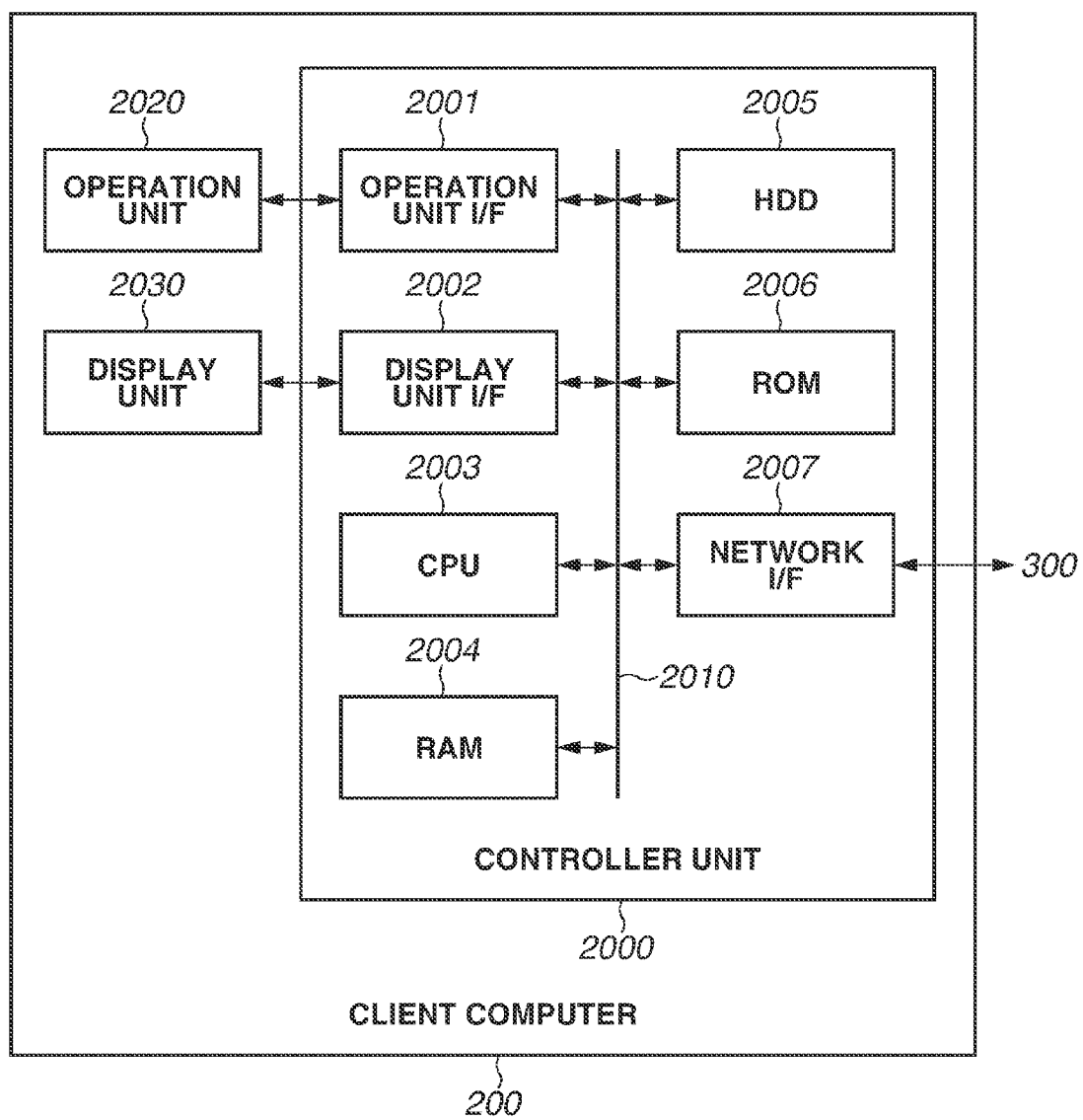
FIG. 6 is a block diagram illustrating an example of a configuration of a client computer according to the present invention.

FIG. 6 is a block diagram illustrating an example of a configuration of the client computer 200. The client computer 200 includes a controller unit 2000, an operation unit 2020, and a display unit 2030.

The controller unit 2000 includes a central processing unit (CPU) 2003. The CPU 2003 boots an operating system (OS) with a boot program stored in a read only memory (ROM) 2006. The CPU 2003 executes on the OS various programs stored in a hard disk drive (HDD) 2005. The CPU 2003 uses a random access memory (RAM) 2004 as a working memory. The HDD 2005 stores data and the like related to various programs such as the OS, the printer driver, and a document-related application. In addition to the ROM 2006 and the RAM 2004, an operation unit interface (I/F) 2001, a display unit I/F 2002, and a network I/F 2007 are connected to a system bus 2010. The operation unit I/F 2001 serves as an interface for the operation unit 2020 including a pointing device, a keyboard, and the like, and transmits information input by the user through the operation unit 2020, to the CPU 2003. The display unit I/F 2002 outputs screen data to be displayed on the display unit 2030 including a display device and the like, to the display unit 2030. The network I/F 2007 transmits and receives data to and from the devices connected thereto via the network 300.

<Software Configuration of Client Computer 200>

Figure 7:
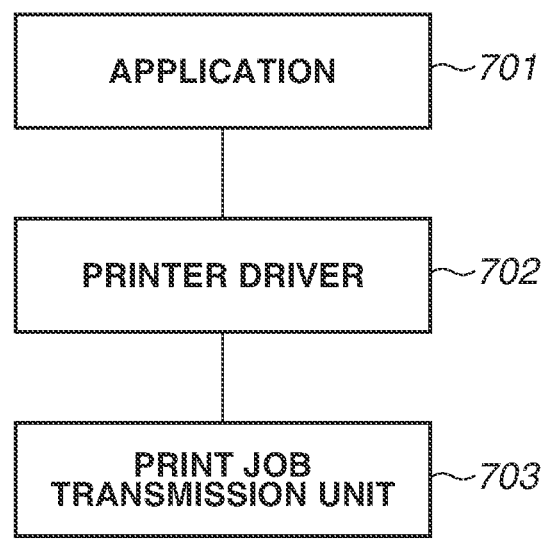
FIG. 7 is a block diagram illustrating an example of a software configuration of the client computer according to the present invention.

FIG. 7 is a block diagram illustrating an example of a software configuration of the client computer 200. The client computer 200 includes an application 701, the printer driver 702, and a print job transmission unit 703.

The application 701 issues a print instruction by transmitting a rendering command and the like to the printer driver 702. The printer driver 702 converts the rendering command received from the print application 701 into print data acceptable by the image forming apparatus 100. The resultant print data, written with a page description language (PDL), is transmitted to the print job transmission unit 703 as a print job. The printer driver 702 has a function of enabling the user to set various settings related to the printing with a graphical user interface (GUI) or the like. The print job transmission unit 703 transmits the print job received from the printer driver 702, to the image forming apparatus 100.

Examples of settings related to the printing that can be set by the user using the printer driver 702 include a color printing setting, a duplex printing setting, a hold printing setting, a print density setting, a toner saving setting, an output face setting, a discharge tray setting, and the like. The hold printing setting causes the image forming apparatus 100 to perform printing only when a user who has transmitted a print job, issues a print instruction at the location of the image forming apparatus 100 by inputting its authentication information and the like. By the density setting, the color density for printing is determined. By the toner saving setting, toner consumption is reduced. The output face setting determines whether a print surface of a printed medium is discharged face up or down. The discharge tray setting designates a discharge tray.

A printing function that is almost the same function as the "hold printing" may also be referred to as authentication printing, secure printing, or pull printing. Thus, in the present invention, the term "hold printing" collectively refers to a function of the image forming apparatus 100 to perform printing only when a user who has transmitted a print job with its computer issues a print instruction after inputting the authentication information and the like into the image forming apparatus 100. The print data transmitted from the user computer and waiting for printing in the case of the "hold printing" may be temporarily stored in a storage device in the image forming apparatus 100 or in a storage service on a network.

<Configuration of Image Forming Apparatus 100>

Figure 2:
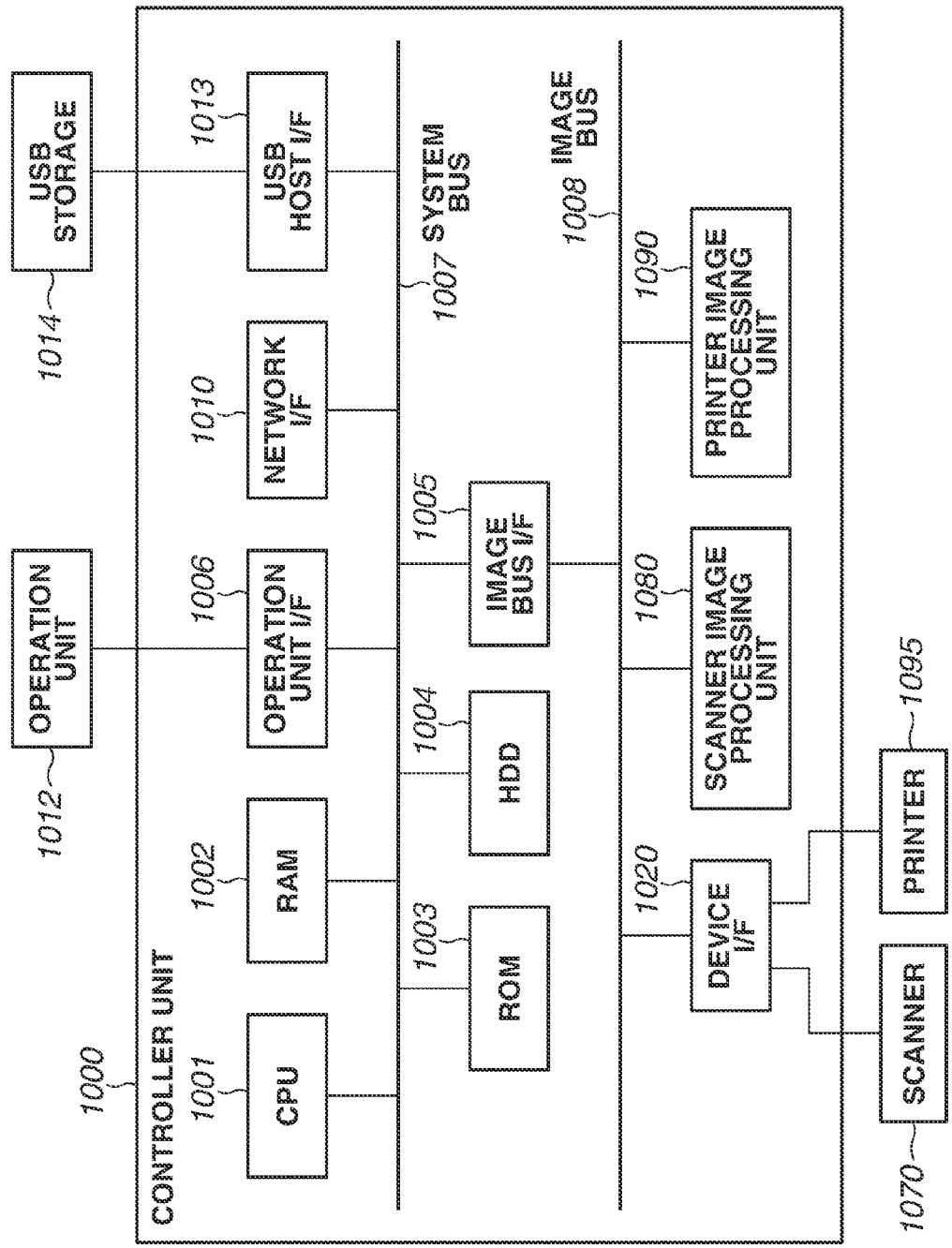
FIG. 2 is a block diagram illustrating an example of a hardware configuration of an image forming apparatus according to the present invention.

FIG. 2 is a block diagram illustrating an example of a hardware configuration of the image forming apparatus 100 specifically as a copying machine. The image forming apparatus 100 includes a controller unit 1000 which is connected to a scanner 1070 functioning as an image input device, a printer 1095 functioning as an image output device, and an operation unit 1012.

The controller unit 1000 performs control to implement a copy function of reading an image with the scanner 1070 and output the resultant image data from the printer 1095. The controller unit 1000 includes a CPU 1001. The CPU 1001 boots an OS with a boot program stored in a ROM 1003. The CPU 1001 executes on the OS a program stored in an HDD 1004, to execute various types of processing. The CPU 1001 uses a RAM 1002 as a work area. The RAM 1002 which thus provides the work area, also provides an image memory area for temporarily storing the image data. The HDD 1004 stores the program and the image data. The CPU 1001 is connected to the ROM 1003, the RAM 1002, an operation unit I/F 1006, a network interface I/F 1010, a universal serial bus (USB) host I/F 1013, and an image bus I/F 1005, via a system bus 1007.

The operation unit I/F 1006 includes a touch panel. The operation unit I/F 1006 serves as an interface to the operation unit 1012, and outputs image data to be displayed on the operation unit 1012, to the operation unit 1012. The operation unit I/F 1006 transmits information input by a user through the operation unit 1012, to the CPU 1001. The information thus input includes authentication information, the print instruction, and the like for the "hold printing" described above. The operation unit 1012 may include a reading unit that reads an integrated circuit (IC) card or biometric information. The network I/F 1010 is an interface through which the image forming apparatus 100 is connected to the network 300.

The USB host I/F 1013 is an interface used for communications with a USB storage 1014. The USB host I/F 1013 outputs data stored in the HDD 1004, to the USB storage 1014. The USB host I/F 1013 also receives data stored in the USB storage 1014, and transfers the data to the CPU 1001. A plurality of USB devices including the USB storage 1014, is connectable to the USB host I/F 1013. The USB storage 1014 serving as an external storage device that stores data, can be detachably connected to the USB host I/F 1013. An image bus I/F 1005 is a bus bridge that connects the system bus 1007 with the image bus 1008 that implements high speed transmission of image data, and converts a data format. The image bus 1008 includes a Peripheral Component Interconnect (PCI) bus, an IEEE1394 device, or the like. A device I/F 1020, a scanner image processing unit 1080, and a printer image processing unit 1090 are provided on the image bus 1008. The device I/F 1020 is connected to the scanner 1070 and the printer 1095, and performs synchronous/asynchronous conversion on image data. The scanner image processing unit 1080 corrects, processes, and edits input image data. The printer image processing unit 1090 performs correction, resolution conversion, and the like appropriate to the printer 1095, on image data for print output.

<Software Configuration of Image Forming Apparatus>

FIG. 3 is a block diagram illustrating a software configuration of an image forming apparatus.

Figure 3A:
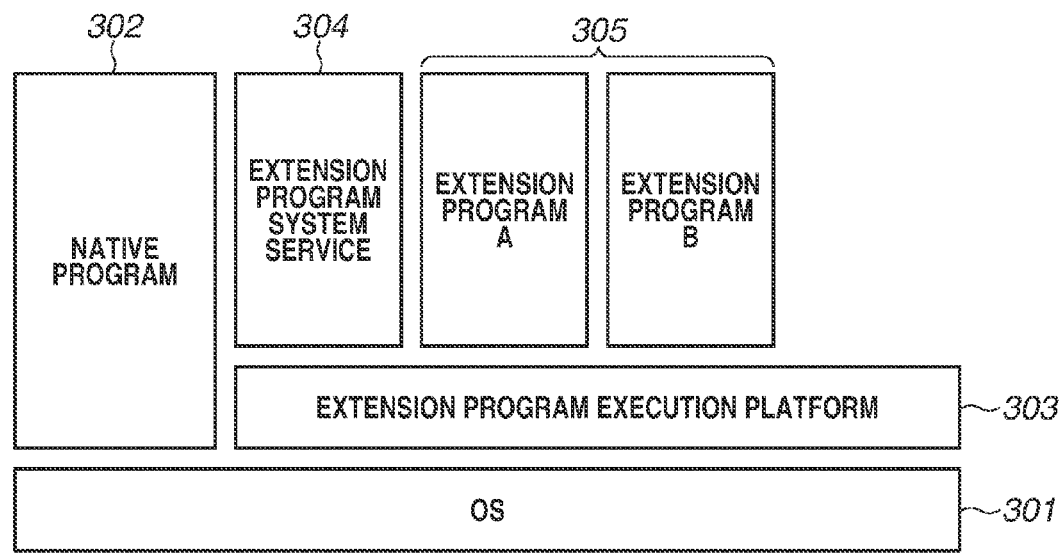
FIGS. 3A and 3B are each a diagram illustrating a software configuration of the image forming apparatus.

FIG. 3A illustrates an example of a software configuration of a conventional image forming apparatus. A native program 302 and an extension program execution platform 303 operate on an OS 301. The extension program execution platform 303 serves as a platform for executing an extension program.

The native program 302 is a basic program for the image forming apparatus, operating on the OS 301. More specifically, the native program 302 controls devices of the image forming apparatus, such as the printer 1095, the scanner 1070, and the operation unit 1012, and implements control of the functions of the devices.

For example, the extension program execution platform 303 is a program implementing an Open Service Gateway initiative (OSGi) framework, and dynamically adds and deletes a program. An extension program system service 304 is a group of programs for providing functions useful in common for extension programs 305. More specifically, the extension program system service 304 performs wrapping for a function provided by the native program 302, and provides the resultant function to the extension programs 305. Each of the extension programs 305 is a program that extends the function of the image forming apparatus operating on the extension program execution platform 303.

The native program 302 has a function of recording and storing information about a print job that can be collected when printing of the print job is completed. Details of the native program 302 related to processing for a print job, are described below with reference to FIG. 4.

Figure 3B:
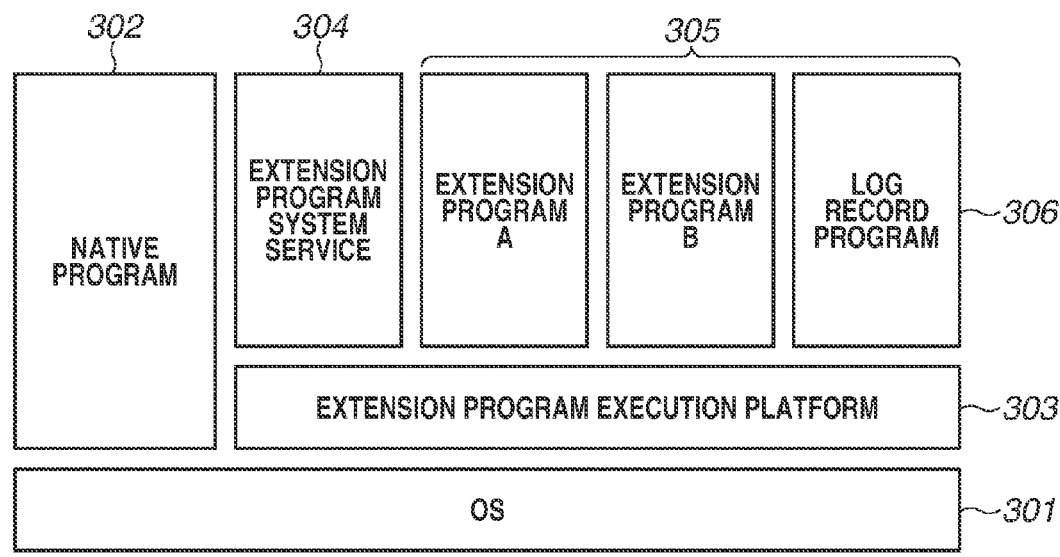

FIG. 3B illustrates an example of a software configuration of the image forming apparatus 100 according to the present invention. The software configuration is different from the configuration illustrated in FIG. 3A in that the extension programs 305 further include a log record program 306.

The log record program 306 is an extension program. The program 306 can manage a print job including a specific print setting which is not recordable as a job log by the native program 302, in distinction from other print jobs. Details of the log record program 306 are described below with reference to FIG. 5.

<Configuration of Native Program 302>

Figure 4:
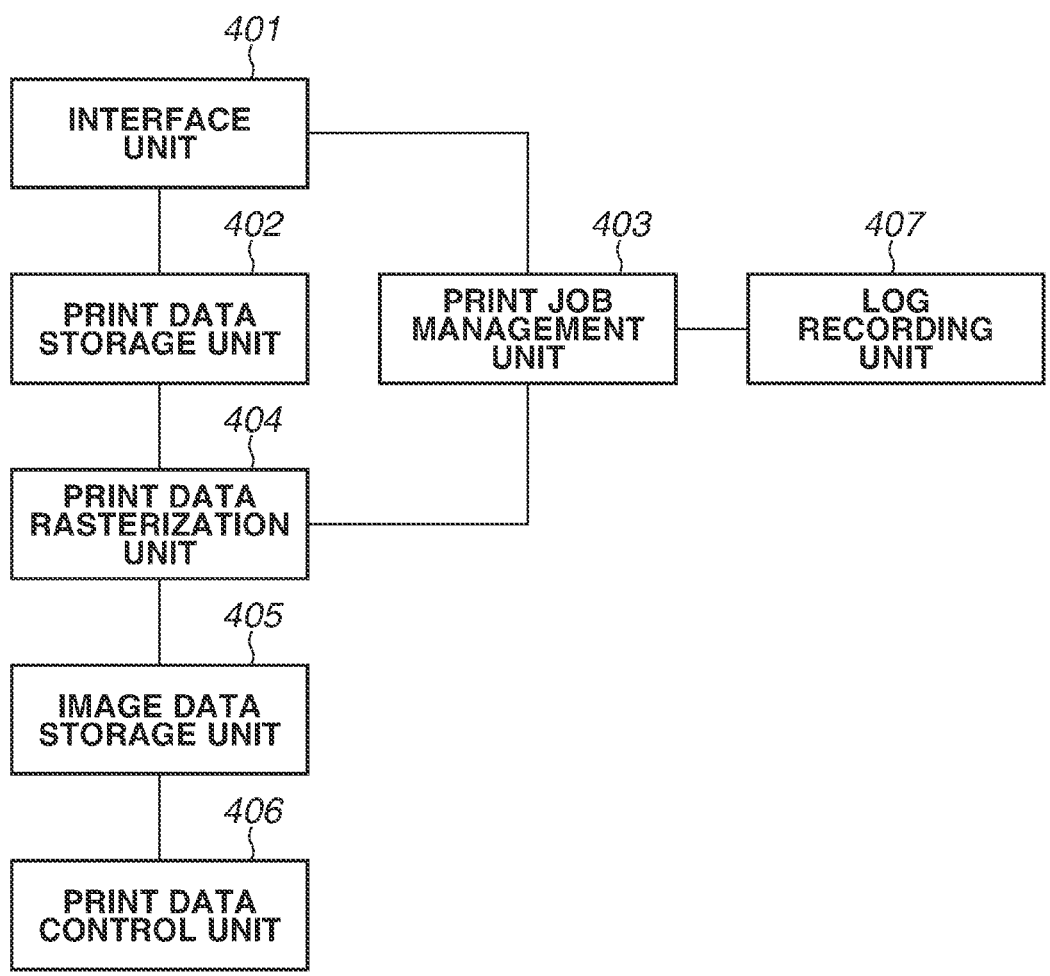
FIG. 4 is a block diagram illustrating an example of a configuration of a native program.

FIG. 4 is a block diagram illustrating an example of a part of a function framework of the native program 302. The native program 302 includes modules such as an interface unit 401, a print data storage unit 402, a print job management unit 403, a print data rasterizing unit 404, an image data storage unit 405, a print control unit 406, and a log recording unit 407.

The interface unit 401 receives data from a device on a network through the network I/F 1010. For example, a print job is received from the client computer 200. The print data storage unit 402 temporarily stores the print job thus received.

When processing of a print job stored in the print data storage unit 402 starts, the print job management unit 403 analyzes the print job to acquire output attribute information indicating a user name, the number of copies, and whether the color print setting is ON. The print job management unit 403 manages the output attribute information as print job information together with start date and time for the print job. Then, the print job management unit 403 issues a job registration event.

FIG. 10A illustrates an example of a data structure of the print job information. In this example, the print job information includes a job identification (ID) as job identification information, an application name and a document name involved in the print job generation, an owner name indicating the user who has issued the print instruction, and an input date and time of the print job. The job identification information is information used by the image forming apparatus 100 for uniquely identifying a job. The print job information further includes setting information set on the printer driver 702 of the client computer 200. The setting information includes a print sheet size setting, a simplex/duplex setting, an N-up printing setting, the print density setting, the toner saving setting, and the hold printing setting. The N-up printing is used for setting the number of logical pages to be printed on a single printed sheet. Furthermore, the print job information includes the output face setting, the discharge tray setting, and the like.

The print data rasterizing unit 404 acquires print data from the print data storage unit 402 and executes image generation processing based on the print job information stored in the print job management unit 403, whereby image data is generated on the RAM 303. The image data storage unit 405 temporarily stores the image data generated by the print data rasterizing unit 404. The print control unit 406 controls the printer 1095 via the device I/F 1020, whereby the image data stored in the image data storage unit 405, is actually printed on a medium such as a sheet of paper, through a known technique such as electrophotography or inkjet technique. The information that can be acquired and managed by the print job management unit 403 as print job information further includes information indicating whether the printing has succeeded/failed in a process from the image data generation to the print output.

The log recording unit 407 receives the print job information managed by the print job management unit 403, at a timing that the printing is completed or cancelled, and records the print job information as a job log. The job log thus recorded is stored in a storage area which enables referring to and acquiring the job log by the log record program 306. The log recording unit 407 issues a log recording event upon recording the job log. When the log recording unit 407 records the job log, corresponding print job information is deleted.

FIG. 10B illustrates an example of a data structure of the job log recorded by the log recording unit 407. The job log recorded by the log recording unit 407 includes the job ID, an application name and a document name involved in the print job generation, an owner name indicating the user who has issued the print instruction, input date and time of the print job, print start date and time, and print end date and time. The print job information further partially includes setting information made on the printer driver 702 of the client computer 200. The setting information includes the print sheet size setting, the simplex/duplex setting, the N-up printing setting, and the number of discharged sheets that have been actually output by printing.

As the job log recorded by the log recording unit 407, output attribute information common to all the print jobs is acquired from the print job information and recorded. The common output attribute information corresponds to fixed items determined by a design specification of the native program 302. Thus, the log recording unit 407 does not acquire or record whether some setting items, in the print settings set for the print job by the client computer 200, are enabled or disabled. Such setting items include "hold printing setting", "print density setting", and "toner saving setting". The log recording unit 407 may not be able to record print setting and post printing processing using an extension option of the image forming apparatus 100 made after the native program 302 has been designed.

<Configuration of Log Record Program 306>

Figure 5:
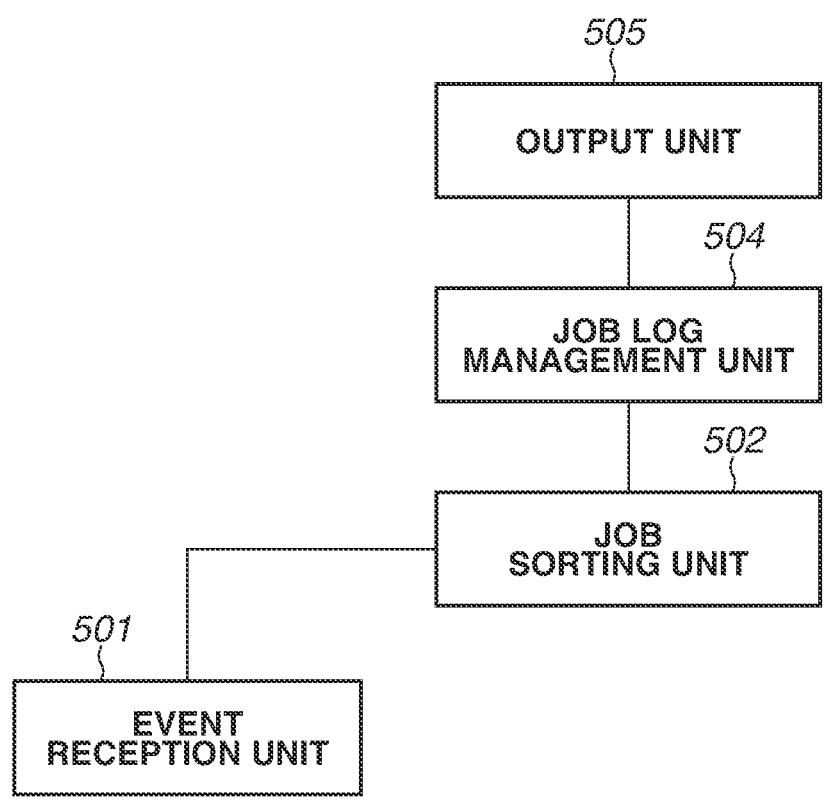
FIG. 5 is a block diagram illustrating a configuration of a log record program.

FIG. 5 is a block diagram illustrating an example of a configuration of the log record program 306. The log record program 306 includes modules such as an event reception unit 501, a job sorting unit 502, a job log management unit 504, and an output unit 505.

The event reception unit 501 receives an event issued by the native program 302 via the extension program system service 304. The event includes the job registration event and the log recording event issued by the log recording unit 407. The event reception unit 501 that has received the job registration event transfers information on the event to the job sorting unit 502. The event reception unit 501 that has received the log recording event transfers information on the event to the job sorting unit 502.

The job sorting unit 502 that has received the event information transferred from the event reception unit 501 analyzes the content of the print job information corresponding to the event. More specifically, when the job registration event has been issued, the job sorting unit 502 determines whether the print job information includes a predetermined print setting. The job sorting unit 502 stores and manages the job identification information in the print job information including the predetermined print setting, in a storage area for the log record program 306. Alternatively, the job sorting unit 502 may store and manage the entire print job information including the predetermined print setting, in the storage area for the log record program 306. On the other hand, when the predetermined print setting is not included, the job sorting unit 502 does not store the corresponding job identification information in the storage area for the log record program 306.

The job sorting unit 502 that has received the information on the log recording event notifies the job log management unit 504 of the reception. Then, the job sorting unit 502 determines whether the identification information on the print job corresponding to the log recording event has already been managed in the storage area for the log record program 306. When the job identification information has already been managed, the job sorting unit 502 transmits information indicating the situation to the job log management unit 504.

The job log management unit 504 records and manages the job log corresponding to the event and recorded in the log recording unit 407, in a log information file in the HDD 1004 managed by the log record program 306, in accordance with the event information received from the job sorting unit 502. A dedicated file for recording the job log of the print job including the predetermined print setting is managed separately from a file for recording job logs of other print jobs. For the print job including the job identification information that has already been managed by the job sorting unit 502, the job log management unit 504 adds the job log recorded in the log recording unit 407, to the dedicated file. When there is a plurality of print setting items as monitoring targets of the job sorting unit 502, a dedicated file is prepared for each of the setting items, and the log recording unit 407 records the job log in the corresponding dedicated file.

For a print job including the job identification information that has already been managed by the job sorting unit 502, the job log management unit 504 may record the job log by adding information indicating that the predetermined print setting has been enabled, to the job log, without distinguishing the files.

The output unit 505 performs control so that the log information file of the print job recorded by the job log management unit 504 is output to the outside of the image forming apparatus 100. For example, the log information file is output by periodically making a transmission to an external computer (not illustrated) using a communication protocol such as Web-based Distributed Authoring and Versioning (WebDAV) or Server Message Block (SMB). Furthermore, a Web server function may be provided and access a browser of the external computer so that the log information file is downloaded. Furthermore, the log information file may be output to a USB flash memory (not illustrated) attached to the image forming apparatus 100.

<Flow of Recording Log Information in Print Job>

Processing of recording log information in a print job in the image forming apparatus 100 is described with reference to FIGS. 8 to 10. A program for executing processing illustrated in FIGS. 8 and 9 is stored in the ROM 1003 or the HDD 1004 and is executed by the CPU 1001.

Figure 8:
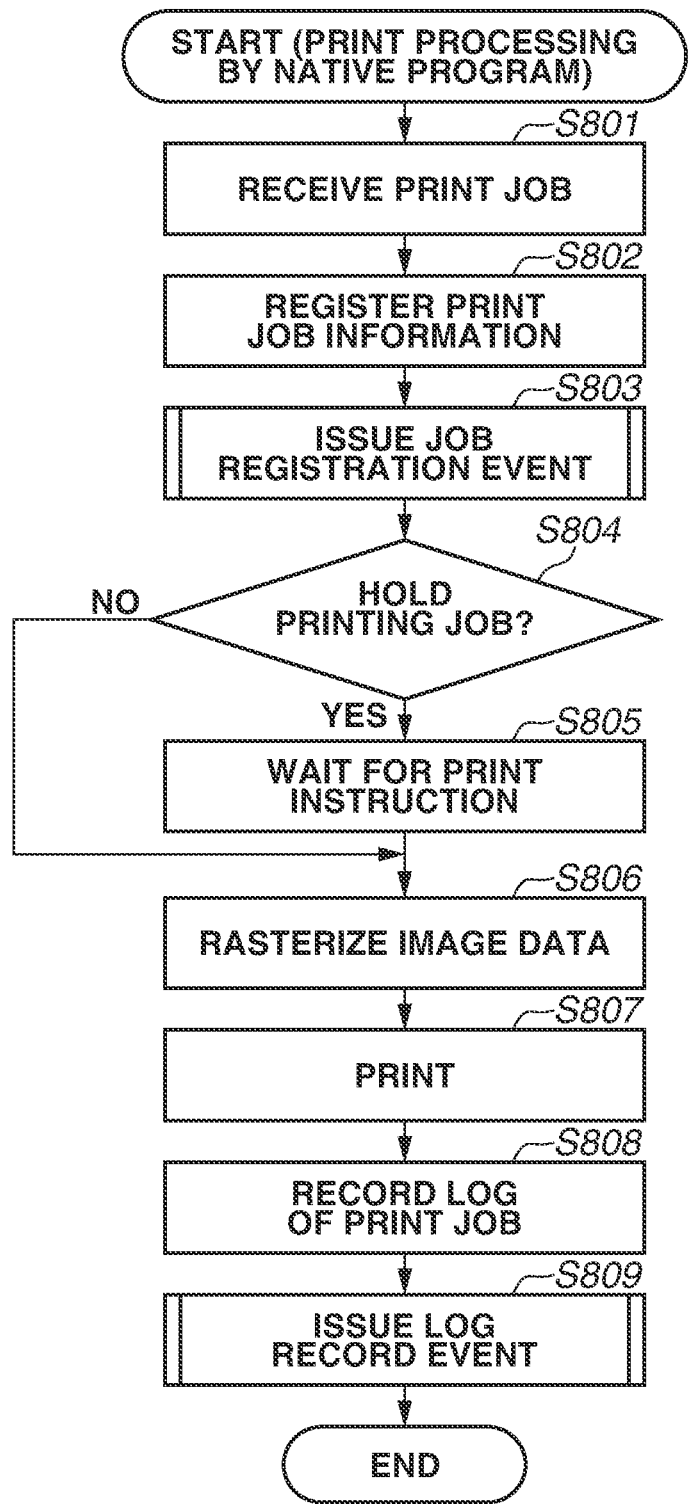
FIG. 8 is a flowchart illustrating execution processing for a print job in the image forming apparatus.

FIG. 8 is a flowchart illustrating execution processing of a print job in the image forming apparatus 100.

In step S801, the interface unit 401 receives a print job from the client computer 200 through the network I/F 1010. Then, the interface unit 401 stores print job data in the print data storage unit 402 and notifies the print job management unit 403 of the reception of the print job.

In step S802, the print job management unit 403 analyzes the print job to acquire the output attribute information such as a user name, the number of copies, and the color printing setting. Then, the print job management unit 403 stores and manages the output attribute information, together with the print job start date and time, in a recording area that can be managed by the print job management unit 403, as the print job information. The specific example of the data structure of the print job information is illustrated in FIG. 10A.

In step S803, the print job management unit 403 issues a job registration event. The event is transmitted to the log record program 306 via the extension program system service 304. Processing executed by the log record program 306 for the event is described below with reference to FIG. 9.

In step S804, the print job management unit 403 analyzes the print job information, and determines whether the job has the enabled hold printing setting. When the job has the enabled hold printing setting (Yes in step S804), the processing proceeds to step S805. On the other hand, when the job does not have the enabled hold printing setting (No in step S804), the processing proceeds to step S806. In step S805, the print job management unit 403 waits for the print instruction from the user. The processing proceeds to step S806 when the print instruction from the user is detected. The print instruction may be issued with authentication information input from the user through card authentication or biometric information (such as a fingerprint) authentication.

In step S806, the print job management unit 403 starts print processing for the print job, and instructs the print data rasterizing unit 404 to rasterize the print data. More specifically, the print data rasterizing unit 403 acquires the print data from the print data storage unit 402, and then executes the image generation processing in accordance with the print job information stored in the print job management unit 403, so that image data is generated on the RAM 303. The print data rasterizing unit 403 stores the image data thus generated in the image data storage unit 405. In step S807, the print job management unit 403 instructs the print control unit 406 to print the image data. The print control unit 406 controls the printer 1095 via the device I/F 1020, whereby the image data stored in the image data storage unit 405, is actually printed on a medium such as a sheet of paper, through a known technique such as electrophotography or inkjet technique.

In step S808, the log recording unit 407 generates a job log including a result of executing the print job, and registers the job log in a storage area which enables referring and acquiring by the log record program 306. A specific example of a data structure of the job log thus generated is illustrated in FIG. 10B. As described above, it is not recorded whether some setting items (such as the "hold printing setting", the "print density setting", and the "toner saving setting"), in the print setting made by the client computer 200 with the printer driver 702 has been enabled or disabled.

In step S809, the print job management unit 403 issues the log recording event, and then the processing is terminated. The log record program 306 is also notified of the event via the extension program system service 304. Processing executed by the log record program 306 in accordance with the event is described below with reference to FIG. 9.

FIG. 9 is a flowchart illustrating recording processing for a job log, executed by the log record program 306.

In step S901, the event reception unit 501 receives an event issued by the print job management unit 403 via the extension program system service 304.

In step S902, the job sorting unit 502 determines whether the event received by the event reception unit 501, is the job registration event. When the received event is the job registration event (Yes in step S902), the processing proceeds to step S903. On the other hand, when the received event is not the job registration event (No in step S902), the processing proceeds to step S905.

In step S903, the job sorting unit 502 determines whether the print job information in the print job corresponding to the job registration event, includes a predetermined print setting which is designated as a monitoring target. In this example, the predetermined print setting is monitored to determine whether a value of the "hold print setting" is enabled or whether a predetermined value is set for "discharge tray". When the predetermined print setting designation is included (Yes in step S903), the processing proceeds to step S904. On the other hand, when the predetermined setting designation is not included (No in step S904), the processing is terminated.

Any predetermined setting may be selected and set as the monitoring target from the operation unit 1012 or a computer on a network, via a setting screen (not illustrated) provided by the log record program 306.

In step S904, the log record program 306 stores the job identification information included in the print job information, in the storage area for the log record program 306. In this case, the job identification information may be stored and managed independently for each predetermined print setting item.

In step S905, the event reception unit 501 determines whether the event received by the event reception unit 501, is the log recording event. When the received event is the log recording event (Yes in step S905), the processing proceeds to step S906. When the received event is not the log recording event (No in step S905), the processing is terminated.

In step S906, the job sorting unit 502 determines whether the job identification information that has been stored in step S904 is present in the job identification information included in the job log corresponding to the log recording event. Thus, the job sorting unit 502 can recognize a record of the job log corresponding to the job identification information stored in step S904. When the job log corresponds to the job identification information that has been stored in step S904 (Yes in step S906), the processing proceeds to step S907. On the other hand, the job log does not correspond to the job identification information that has been stored in step S904 (No in step S906), the processing proceeds to step S909.

In step S907, the job log management unit 504 records the job log corresponding to the log recording event, in a dedicated file. In this example, a job log corresponding to a print job in which the "hold print setting" is enabled is recorded in the dedicated file for the "hold print setting". A job log corresponding to a print job in which the "discharge tray" is arbitrarily designated is recorded in a dedicated file for the "discharge tray".

In step S908, the job sorting unit 502 deletes the job identification information corresponding to the job log recorded in the dedicated file, and the processing is terminated.

In step S909, the job log management unit 504 records the job log corresponding to the log recording event, in a file for recording a normal log, and the processing terminated. The job log in the file is a job log corresponding to a print job which does not include a print setting as a monitoring target of the log record program 306.

In the present exemplary embodiment, a job log corresponding to a print job that the native program 302 could not conventionally record as a job log can be recognized with a dedicated file managed by the log record program 306.

A second exemplary embodiment is described below. The information indicating whether the "hold print setting" is enabled or disabled is not recorded as a job log by the native program 302, as in the example described in the first exemplary embodiment. In the second exemplary embodiment, a further problem that may arise in the recording of the job log in which the hold printing setting is ON, and its solution are described.

As described above, printing of the print job in which the hold print setting is ON is not started (executed) until the user issues a print instruction to the image forming apparatus 100 that has received the print job. In other words, the job data is stored and held in the image forming apparatus 100 until the print instruction is issued from the user. When the image forming apparatus 100 shuts down in such a holding state, the hold printing is canceled and processing of deleting the job data in the image forming apparatus 100 is executed to reduce the possibility of information leak such as taking out data by somebody else.

In shutdown processing of the image forming apparatus 100, the native program 302 and the extension program 305 proceed in parallel. Thus, the log record program 306 may be terminated before a registration event of print job information indicating cancellation of the hold printing due to the shutdown processing, is issued by the native program 302. Thus, the log record program 306 cannot record the job log indicating that the print job including the hold print setting has been canceled, in the dedicated file.

Thus, in the second exemplary embodiment, a solution to this problem is described. Description of configurations that are the same as those in the first exemplary embodiment is omitted. Only a portion unique to the present exemplary embodiment is described in detail below.

<Flow of Terminating Processing of Log Record Program 306>

FIG. 11 is a flowchart illustrating terminating processing executed by the log record program 306 when the image forming apparatus 100 shuts down. The processing is executed by the log record program 306 when a termination event due to the shutdown of the image forming apparatus 100 is issued. When the processing starts, the sorting unit 502 starts counting a number of seconds.

In step S1101, the job sorting unit 502 determines whether the job identification information stored in step S904 still exists without having being deleted. When the job identification information still exists (Yes in step S1101), the processing proceeds to step S1102. On the other hand, when the job identification information does not exist (No in step S1101), the processing is terminated.

In step S1102, the job sorting unit 502 determines whether the number of seconds counted after the processing has started exceeds a timeout value. When the counted number of seconds exceeds the timeout value (Yes in step S1102), the processing is terminated. On the other hand, when the time counted in seconds do not exceed the timeout value (No in step S1102), the processing proceeds to step S1103. In step S1103, the job sorting unit 502 sleeps for a predetermined period of time (several seconds), and then the processing returns to step S1101.

The processing is based on the timeout value (for example, 10 seconds) in steps S1102 and S1103. More specifically, the termination of the log record program 306 is postponed by the time corresponding to the timeout value. The processing aims to postpone the termination of the log record program 306 until the log registration event is issued for the job log indicating that the job is canceled as described below with reference to FIG. 12.

When the processing illustrated in FIG. 11 is terminated, the log record program 306 is terminated.

<Flow of Hold Printing Job Cancel Processing>

Figure 12:
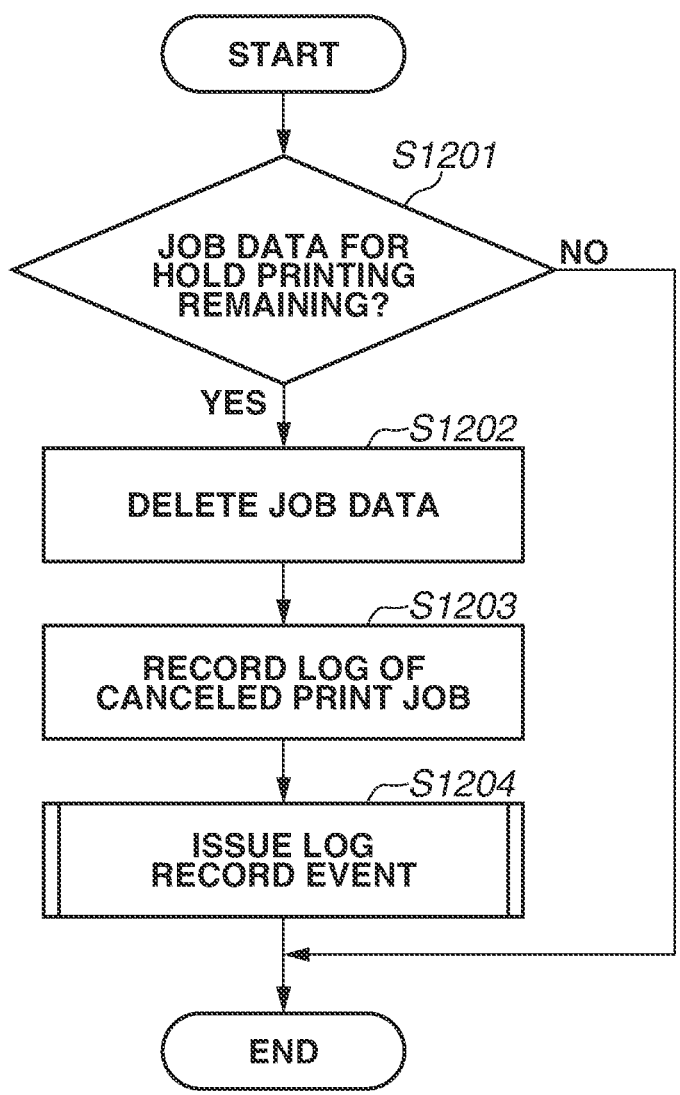
FIG. 12 is a flowchart illustrating job cancelling processing executed by the native program, according to the second exemplary embodiment.

FIG. 12 is a flowchart illustrating a flow of cancel processing, of the hold printing job, executed by the native program 302 when the image forming apparatus 100 shuts down.

In step S1201, the print job management unit 403 determines whether the job data on the print job in which the hold printing setting is ON still exists in the print data storage unit 402. When such job data still exists (Yes in step S1201), the processing proceeds to step S1202. When such job data does not exist (No in step S1201), the processing is terminated. In step S1202, the print job management unit 403 deletes the job data stored in the print data storage unit 402.

In step S1203, the log recording unit 407 records, as a job log of a cancelled print job that is a target job of the processing, information indicating that the print job has been canceled, in the storage area which can be referred to and acquired by the log record program 306.

In step S1204, the print job management unit 403 issues the log recording event, and then the processing is terminated. The log record program 306 is also notified of the event via the extension program system service 304. The processing executed by the log record program 306 for the event is described above with reference to FIG. 9.

When the processing illustrated in FIG. 12 is terminated, the native program 302 is terminated.

<Flow of Start Processing for Log Record Program 306>

FIG. 13 is a flowchart illustrating start processing executed by the log record program 306 when the image forming apparatus 100 is started.

In step S1301, the job sorting unit 502 determines whether the job identification information stored in step S904, still exists undeleted. When such job identification information still exists (Yes in step S1301), the processing proceeds to step S1302. When such job identification information does not exist (No in step S1301), the processing is terminated.

In step S1302, the job sorting unit 502 accesses the storage area where the job log is recorded by the log recording unit 407 via the extension program system service 304, and acquires a job log corresponding to the job identification information stored. In step S1303, the job log management unit 504 records the job log acquired in step S1302, in the dedicated file. In step S1304, the job sorting unit 502 deletes the job identification information corresponding to the job log recorded in the dedicated file, and the processing is terminated.

In the exemplary embodiment described above, the job log related to the canceling of the hold printing due to the shutdown of the image forming apparatus 100 can be recorded without fail.

The present invention includes an apparatus, a system, and a method therefor obtained by appropriately combining the plurality of exemplary embodiments described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-187462, filed Sep. 24, 2015, which is hereby incorporated by reference herein in its entirety.

What is claimed is:

1. A printing apparatus in which a basic program for controlling execution of a print job operates, the printing apparatus comprising:
 a memory storing instructions related to a log record program as an extension program of the printing apparatus; and
 a processor which is capable of executing the instructions causing the printing apparatus to:
 receive event issued according to the basic program;
 determine, for a job registration event, as the received event, issued according to the basic program when a print job is received, whether the print job includes designation of a print setting as a monitoring target;
 store identification information of the print job in a predetermined storage area of the printing apparatus when it is determined that the print job includes the designation of the print setting as the monitoring target, wherein, when the print job does not include the designation of the print setting as the monitoring target, identification information of the print job is not stored in the predetermined storage area;

determine, for a job registration event, as the received event, issued according to the basic program when a job log corresponding to the print job is recorded, whether identification information in the job log has been stored in the predetermined storage area;

record the job log in a first file when it is determined that the identification information included in the job log is stored in the predetermined storage area; and record the job log in a second file different from the first file when it is determined that the identification information included in the job log is not stored in the predetermined storage area.

2. The printing apparatus according to claim 1, wherein the print setting as the monitoring target is information that is not recorded as a job log by the basic program.

3. The printing apparatus according to claim 1, wherein the print setting as the monitoring target is selectable through a setting screen.

4. The printing apparatus according to claim 1, wherein the print setting as the monitoring target is at least one of a print setting for determining a density of a printed color, a print setting for reducing toner consumption, a print setting for determining whether a printed surface of a discharged printed medium faces up or down, and a print setting for designating a discharge tray.

5. The printing apparatus according to claim 1, wherein the print setting as the monitoring target is a setting for causing the printing apparatus to execute printing after the printing apparatus has received a print job, when the user issues a print instruction.

6. A control method for a printing apparatus in which a basic program for controlling execution of a print job operates, the printing apparatus comprising a memory storing instructions related to a log record program as an extension program of the printing apparatus and a processor which is capable of executing the control method, the control method comprising:

receiving event issued according to the basic program;

determining, for a job registration event, as the received event, issued according to the basic program when a print job is received, whether the print job includes designation of a print setting as a monitoring target;

storing identification information of the print job in a predetermined storage area of the printing apparatus when the print job includes the designation of the print setting as the monitoring target, wherein, when the print job does not include the designation of the print setting as the monitoring target, identification information of the print job is not stored in the predetermined storage area; and determining, for a job registration event, as the received event, issued according to the basic program when a job log corresponding to the print job is recorded, whether identification information in the job log has been stored in the predetermined storage area;

recording the job log in a first file when it is determined that the identification information included in the job log is stored in the predetermined storage area; and recording the job log in a second file different from the first file when it is determined that the identification information included in the job log is not stored in the predetermined storage area.

7. A non-transitory computer readable storage medium on which is stored instructions related to a log record program as an extension program of a printing apparatus that, when executed by a processor, implements a method for the printing apparatus in which a basic program for controlling execution of a print job operates, the method comprising:

receiving event issued according to the basic program;

determining, for a job registration event, as the received event, issued based on the basic program when a print job is received, whether the print job includes designation of a print setting as a monitoring target;

storing identification information of the print job in a predetermined storage area of the printing apparatus when the print job includes the designation of the print setting as the monitoring target, wherein, when the print job does not include the designation of the print setting as the monitoring target, identification information of the print job is not stored in the predetermined storage area;

determining, for a job registration event, as the received event, issued according to the basic program when a job log corresponding to the print job is recorded, whether identification information in the job log has been stored in the predetermined storage area;

recording the job log in a first file when it is determined that the identification information included in the job log is stored in the predetermined storage area; and recording the job log in a second file different from the first file when it is determined that the identification information included in the job log is not stored in the predetermined storage area.

* * * * *